United States Patent
Konik et al.

(10) Patent No.: US 9,507,636 B2
(45) Date of Patent: *Nov. 29, 2016

(54) RESOURCE MANAGEMENT AND ALLOCATION USING HISTORY INFORMATION STORED IN APPLICATION'S COMMIT SIGNATURE LOG

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Otsego, MN (US); Chad A. Olstad, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,540

(22) Filed: Apr. 20, 2015

(65) Prior Publication Data

US 2016/0306665 A1 Oct. 20, 2016

(51) Int. Cl.
| | | |
|---|---|---|
| *G06F 9/50* | (2006.01) | |
| *G06F 9/455* | (2006.01) | |
| *G06F 9/46* | (2006.01) | |
| *G06F 17/30* | (2006.01) | |
| *G06F 9/48* | (2006.01) | |

(52) U.S. Cl.
CPC ......... *G06F 9/5011* (2013.01); *G06F 9/45533* (2013.01); *G06F 9/45558* (2013.01); *G06F 9/466* (2013.01); *G06F 9/5005* (2013.01); *G06F 9/48* (2013.01); *G06F 17/30* (2013.01); *G06F 2009/4557* (2013.01)

(58) Field of Classification Search
CPC ........... G06F 9/45533; G06F 9/45558; G06F 2009/4557; G06F 9/466; G06F 9/48; G06F 9/5005; G06F 9/5011; G06F 17/30
See application file for complete search history.

(56) References Cited

U.S. PATENT DOCUMENTS

| | | | | |
|---|---|---|---|---|
| 5,530,855 | A * | 6/1996 | Satoh | G06F 11/2064 707/648 |
| 7,415,453 | B2 * | 8/2008 | Suzuki | G06F 11/3409 |
| 2002/0116441 | A1 * | 8/2002 | Ding | G06F 9/5011 718/105 |

(Continued)

OTHER PUBLICATIONS

Konik et al., "Managing Resources Based on an Application's Historic Information," U.S. Appl. No. 14/737,649, filed Jun. 12, 2015.

(Continued)

*Primary Examiner* — Benjamin Wu
(74) *Attorney, Agent, or Firm* — Robert J. Shatto; Feb R. Cabrasawan

(57) ABSTRACT

Aspects of the present disclosure are directed towards managing computing resources. Managing computing resources can include initializing in a computer system, an application that corresponds to one or more commit signatures, each of the one or more commit signatures correspond to a transaction within the application and determining that a commit signature of one or more commit signatures is saved in a commit block (COB). Managing computing resources can include retrieving, from the COB, in response to determining that the commit signature is saved in the COB, a first set of resource data that corresponds to the commit signature, the first set of resource data contains information for resource usage that corresponds to the application and allocating resources accessible to the computer system based on the first set of resource data.

9 Claims, 7 Drawing Sheets

(56) References Cited

U.S. PATENT DOCUMENTS

| | | | |
|---|---|---|---|
| 2005/0010572 A1* | 1/2005 | Clark | G06F 17/30592 |
| 2007/0174185 A1* | 7/2007 | McGoveran | G06F 11/1474 705/39 |
| 2009/0070457 A1* | 3/2009 | McKinney | G06F 9/505 709/224 |
| 2009/0240742 A1* | 9/2009 | Burghard | G06F 9/466 |
| 2010/0138571 A1* | 6/2010 | Cain, III | G06F 9/467 710/56 |
| 2010/0228650 A1* | 9/2010 | Shacham | G06F 17/30477 705/34 |
| 2011/0161973 A1* | 6/2011 | Klots | G06F 17/30566 718/104 |
| 2011/0302569 A1* | 12/2011 | Kunze | G06F 8/62 717/169 |
| 2012/0253871 A1* | 10/2012 | Tracey | G06Q 30/0283 705/7.13 |
| 2012/0317580 A1* | 12/2012 | Catterall | G06F 11/3409 718/104 |
| 2013/0185433 A1* | 7/2013 | Zhu | H04L 67/303 709/226 |
| 2013/0268940 A1* | 10/2013 | Gmach | G06F 9/5077 718/104 |
| 2014/0208001 A1* | 7/2014 | Liu | G06F 3/0685 711/103 |
| 2014/0289735 A1* | 9/2014 | Togawa | G06F 11/3442 718/104 |
| 2015/0215234 A1* | 7/2015 | Shanmuganathan | H04L 41/50 709/226 |
| 2015/0242214 A1* | 8/2015 | Busaba | G06F 9/5011 712/207 |
| 2015/0378786 A1* | 12/2015 | Suparna | G06F 9/5011 718/104 |

OTHER PUBLICATIONS

List of IBM Patents or Patent Applications Treated as Related.

Anonymous, "Method to optimize resource requirement for OSGi application in cloud", An IP.com Prior Art Database Technical Disclosure, Mar. 21, 2013. IP.com No. 000226038. http://ip.com/IPCOM/000226038.

Attiya et al., "Transactional Contention Management as a Non-Clairvoyant Scheduling Problem", Technion—Israel Institute of Technology, Feb. 26, 2007, pp. 1-18.

Haque et al., "Resource Allocation in Communication Networks Using Market-Based Agents", School of Electronics and Computer Science, University of Southampton, pp. 187-200. EPSRC funded Mohican Project (Reference No. GR/R32697/01).

IBM, "An efficient method to allocate resources to a virtual machine", An IP.com Prior Art Database Technical Disclosure, Jun. 25, 2009. IP.com No. 000184441. http://ip.com/IPCOM/000184441.

Mell et al., "The NIST Definition of Cloud Computing", Recommendations of the National Institute of Standards and Technology, Sep. 2011. U.S. Department of Commerce, NIST Special Publication 800-145.

\* cited by examiner

RESOURCE MANAGEMENT AND ALLOCATION USING HISTORY INFORMATION STORED IN APPLICATION'S COMMIT SIGNATURE LOG

BACKGROUND

The present disclosure relates to data processing, and more specifically, to performance analysis for managing computing resources.

Database management systems (DBMS) are computer software applications that can interact with an end user, applications, or a database (DB) to capture and analyze data. A general-purpose DBMS is designed to allow a definition, creation, querying, update, and administration of databases. The end user may be any user of the software application, e.g. someone buying merchandise online would be an end user and the process of submitting a payment online could be the application. The DBMS can serve as an interface between the database and application programs to assist in organizing data so that it remains easily accessible.

SUMMARY

Embodiments of the present disclosure are directed towards a method for managing computing resources. In embodiments, the method can include initializing in a computer system, an application that corresponds to one or more commit signatures. In embodiments, each of the one or more commit signatures correspond to a transaction within the application. In embodiments, the method can include determining that a commit signature of one or more commit signatures is saved in a commit block (COB). In embodiments, the method can include retrieving, from the COB, in response to determining that the commit signature is saved in the COB, a first set of resource data that corresponds to the commit signature, the first set of resource data contains information for resource usage that corresponds to the application. In embodiments, the method can include allocating resources accessible to the computer system based on the first set of resource data.

Aspects of the present disclosure are directed towards a system for managing computing resources. In embodiments, the system can include a processor and a computer readable storage medium having program instructions embodied therewith. In embodiments, the program instructions are executable by the processor to cause the system to initialize in a computer system, an application that corresponds to one or more commit signatures. In embodiments, each of the one or more commit signatures correspond to a transaction within the application. In embodiments, the program instructions can cause the system to determine that the one or more commit signatures are not saved in a commit block (COB). In embodiments, the program instructions can cause the system to generate, in response to determining that the commit signature is not saved in the COB, a set of resource data by saving the one or more commit signatures. In embodiments, the set of resource data contains information for allocating resources that correspond to the application in the form of one or more commit signatures. In embodiments, the program instructions can cause the system to save the set of resource data in the COB, the set of resource data corresponding to the one or more commit signatures.

Aspects of the present disclosure are directed towards a computer program product for managing computing resources, the computer program product comprising a computer readable storage medium having program instructions embodied therewith, wherein the computer readable storage medium is not a transitory signal per se, and the program instructions executable by a computer to perform a method. In embodiments, the method can include initializing in a computer system, an application that corresponds to one or more commit signatures. In embodiments, the method can include determining that the one or more commit signatures are not saved in a commit block (COB). In embodiments, the method can include generating, in response to determining that the commit signature is not saved in the COB, a set of resource data by saving the one or more commit signatures. In embodiments, the set of resource data can contain information for allocating resources that correspond to the application in the form of one or more commit signatures. In embodiments, the method can include saving the set of resource data in the COB, the set of resource data corresponding to the one or more commit signatures.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
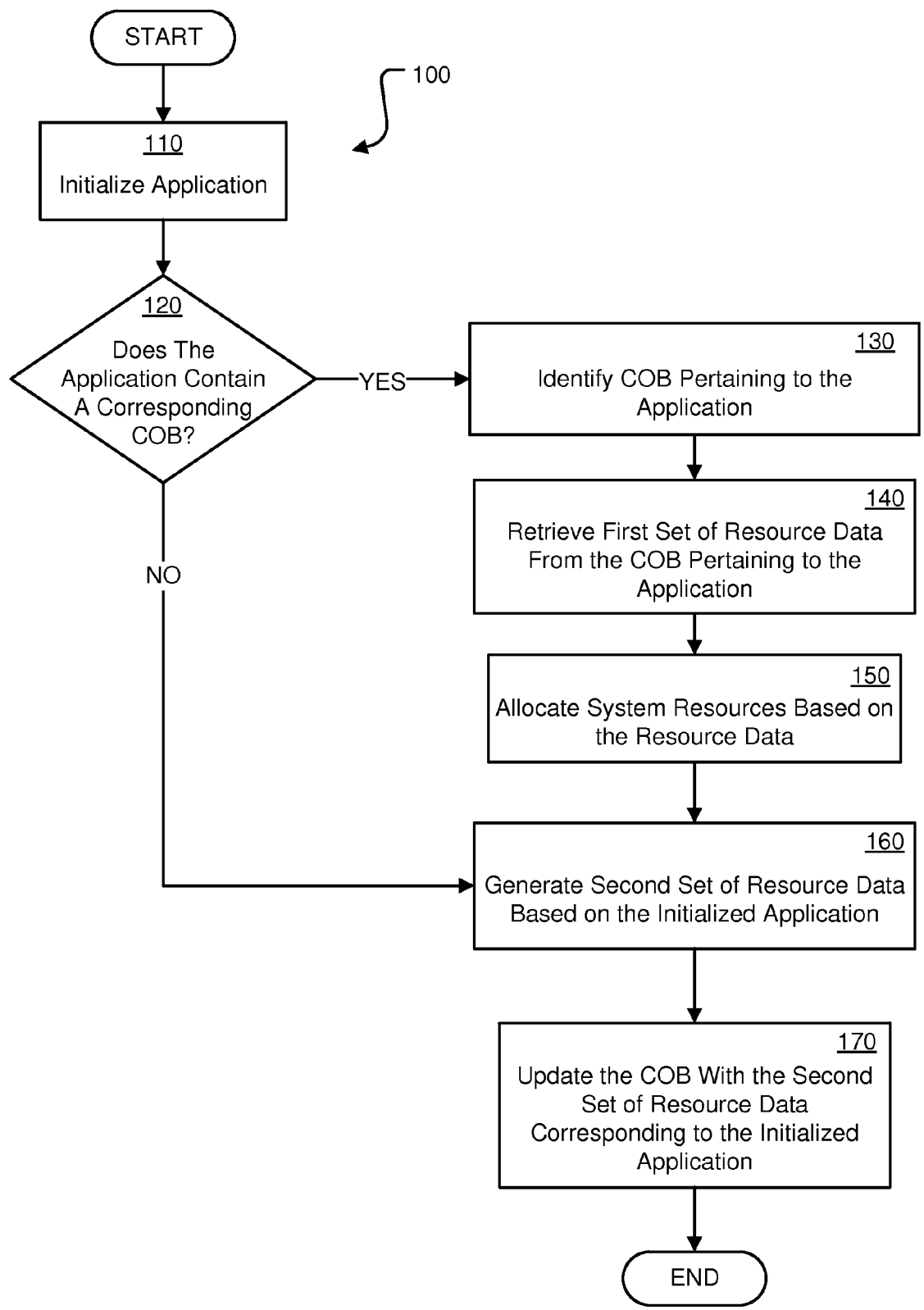
FIG. 1 illustrates a flowchart for a method of allocating systems resources based on a COB that corresponds to an application, according to various embodiments.

While the invention is amenable to various modifications and alternative forms, specifics thereof have been shown by way of example in the drawings and will be described in detail herein. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data processing, more particular aspects relate to performance analysis for managing computing resources. While the present disclosure is not necessarily limited to such applications, various aspects of the disclosure may be appreciated through a discussion of various examples using this context.

When an application is initialized, a computer system can use computer resources in order to allow the application to be successfully run. Information pertaining to the resources used by the computer system can be stored in a database management system (DBMS). At times the resources needed in order for the application to successfully run are not available, and the lack of available resources may delay running of the application or create resource contention between isolated applications. This delay or resource contention can waste system resources and energy.

In embodiments, an application is a computer program designed for an end user to perform a specific task on a computing device, e.g. mobile device, tablet, or computer system. In embodiments, the application can include one or more transactions in the form of a set of instructions, written for performing a specific task within the device. These transactions can be committed at various points in the application. In embodiments, committing one or more transactions can generate a commit signature, described further herein.

In embodiments, in order for applications to run they require resources within a computer system. In embodiments, resources are one or more physical or virtual components of limited availability within a computer system. Resources could include network connections, memory, processing power, file space, database files, and other computer resources. For example, in order to complete the online request, the application can require a particular amount of memory, DB files, or processing power. If the resources are not available, the application may be delayed until the resources are made available. In embodiments, the lack of available resources can cause resource contention amongst resource-deprived applications. The computer resources may be limited. The computer resources may be unavailable because there are too many applications running in parallel that require more resources than available within the computer system. By allocating resources within the computer system, the one or more transactions can complete the set of instructions.

In embodiments, computers, such as virtual machines (VMs), can have resources allocated to them depending on their needs to complete an application. If a computer system does not have sufficient resources to complete an application, the computer system can allocate computing resources to complete the application. In embodiments, application delay or resource contention between applications can be reduced by preparing the resources necessary for completing an application once an application has been initialized. In embodiments, initializing is the starting process of executing an application. For example, initializing includes assigning an initial value for a data object associated with the application and creating enough file space to run the application. For example, initialing the application may occur in response to an end user completing a request online, such as making an online payment, logging into a social network, or saving a document on the device.

In embodiments, completion of one or more transactions is represented by one or more changes within a database (DB) of the computer system. For example, the one or more changes can include a unit of work against the DB. In embodiments, the unit of work may be processing power used per unit time. For example, the one or more changes can be changes in the amount of available memory, processing power, or file space. The one or more changes may be updated within the DB by the DBMS issuing a DB commit during the process of executing the application. In embodiments, execution is a process by which a computer or virtual machine carries out a set of instructions for an application. In embodiments, execution can begin with initializing the application and continues until the application ends. In embodiments, the change in the DB can be recorded in the form of the DB commit that writes information containing the changes to the DB. For example, the DB commit can be issued after the completion of one or more transactions. In embodiments, the information included in the DB commit can include one or more resources used by the computer system allowing the one or more transactions to run. In embodiments, the unit of work against the database may be memory used per unit time.

When an application is initialized, the application can open a DB file that can be reserved for one or more DB commit operations. By issuing the DB commit upon completion of the application, the reserved DB file can be filled with the corresponding data that can be contained in the DB commit. The information recorded to the DB can be information pertaining to the resources used by the computer system during the application. For example, the information can include memory used, amount of processing power used, and file space used. In embodiments, once the application is complete (e.g., once no more resources are used in association with the application) the DB commit updates the database with a report of one or more resources that were used during the transaction. Accordingly, the computer system can allocate resources to the application based on resource information contained in the DB commit in order to reduce resource contention.

Now turning to FIG. 1, a flowchart for a method 100 of managing resources based on an applications resource history can be seen, according to various embodiments. In embodiments, the method 100 can include, in operation 110, initializing an application. In embodiments, initializing the application can be accomplished by the DBMS upon seeing a reference to the application, start of a DB commit, and a particular line number in a program or file. In embodiments, initializing the application can also be accomplished by an end user. In embodiments, initializing the application may be accomplished via a computer system. In embodiments, after initializing the application, the operation 110 can proceed to a decision block 120.

In embodiments, the decision block 120 can include determining after initializing the application, if the application has a corresponding commit block (COB). In embodiments, the COB is a permanent object that can be created in a computer library, the computer library can be a DB. The computer library can be a collection of precompiled routines that a computer program can use to execute an application. The routines, sometimes called modules, can be stored in object format. Libraries can be beneficial for storing frequently used routines because one may not need to explicitly link them to every program that uses them. For example, the routines can pertain to instructions for executing an application or transaction. In embodiments, the library can used for system journaling, as well as retaining data from failing transactions. In embodiments, system journaling can maintain a log or a journal of activity associated with data areas of the DB of the computer system, e.g. areas of the DB associated with resources used in order to complete an application. In embodiments, the areas in the DB associated with the resources used for completing an application can be retrieved in the form of commit signatures.

In embodiments, the commit signature is a verification that the DB commit has been issued and that the changes have been successfully recorded within the DB. In embodiments, the commit signature can include resource history corresponding to and substantially similar in content as the information contained in the DB update. For example, the commit signature can contain resource history corresponding to the resources needed to allow an application to run and resources needed in order to issue a DB commit. For example, an application may have multiple commit blocks and each may have a difference resource requirement. The commit signature can also contain resource history corresponding to the resources needed to allow a DB commit to record information to the DB. For example, if the DB commit recorded to the DB such information as the amount of memory used by the computer system for running an application, then the commit signature can include the amount of memory used by the computer system for running the application. A commit signature can contain resource history of one or more particular resources used (during the application e.g. memory, processing power). For example, a first commit signature may contain information pertaining to the amount of memory used for running the application, while a second commit signature may contain information pertaining to the amount of processing power needed by the computer system for running the application, further while a third commit signature could have multiple resource usages against it (e.g. processing power, random access memory (RAM) usage, table space or file space increase needs, etc. . . . ). So for every DB update committed, there can be a corresponding commit signature. In some instances, various applications will have one or more transactions and then issue a database (DB) commit at the end of the application, and thus, have thousands or even millions of DB updates committed.

In embodiments, when commit operations are performed, the COB can record one or more DB commit operations in the form of storing commit signatures. These COBs can be saved using COB pooling for running the application in the future, as discussed herein. A method for managing resources can include storing the resource history contained in the DB commit operations. In embodiments, the commit block COB can store resource history pertaining to one or more commit operations by saving the commit signatures associated with the commit operations. In embodiments, the COB is an organized list of one or more commit signatures corresponding to one or more applications. For example, in embodiments, the COB can keep a record of the DB commit operations performed upon completion of an application. Thus, the COB can contain resource history of the resources used by the computer system in order to successfully run the application.

If an application does not have an associated COB, the application may have not been previously initialized by the computer system. If the application has an associated COB, the application may have been initialized by the computer system. If the application has an associated COB, the COB associated to the application may have been initialized by another computer system and a copy of the COB may have been transferred to the computer system. In embodiments, after determining if the application contains an associated COB, the operation can proceed to an operation 130. In embodiments, if the application does not contain an associated COB, the decision block 120 can proceed to an operation 150.

In embodiments, commit signatures can be based on a program name and often an offset of a program or a program stack. The COB can be identified or obtained based on the program name. In embodiments, the COB can be stored separately from the program. For example, the COB can be stored in a computer system. In some embodiments, the COB can be stored in the program object. In some embodiments, the COB can be pointed to by a query plan (access plan). For example, the COB can be stored in the initial query of a transaction. In some embodiments, a pointer can be inserted into the program object at or near the start of the transaction, and the pointer points to the memory location where the COB can be created, stored, and accessed. In embodiments, the COB can be attached to a job. In embodiments, the COB can also be attached to a thread of execution. The thread of execution is the smallest sequence of programmed instructions that can be managed independently by a job scheduler. The job scheduler can be a part of the operating system.

In embodiments, the operation 130 may include identifying the particular COB pertaining to the application. In embodiments, the operation 130 can include searching the COB pool for the COB. In embodiments, the COB can be attached to the application or saved in a COB pool. In embodiments, when initializing an application that has an attached COB (potentially from a different user or job), the computer system can identify the resource history stored in the COB. The database could then use the resource history to prepare one or more operations that correspond to the application, and the computer system could allocate computing resources according to the resource history. In embodiments, for example, once the application is initialized, if the application does not have an attached COB, the computer system can search for the COB associated with the application in the COB pool.

In embodiments, the COB pool is an electronic representation of a collection of one or more COBs in the form of an organized list. In embodiments, the computer system can store COBs in the COB pool rather than having to continually create and destroy COBs for a given journal. For example, COB pooling could reduce contention in the library by organizing files pertaining to application so that the files can be retrieved by the computer system quickly. This can be beneficial for allocating resources needed by the application before running the application. If the computing resources are allocated before the computer system runs the application, the computer system may not have to compete for resources with other applications. After an application has been successfully committed, a COB associated with an application may be stored in the COB pool. In embodiments, the COBs in the COB pool could have resource history retained within it to enable a way to recognize a given commit signature (such as program name, job name, etc. . . . ) corresponding to an application. The computer system can identify one or more commit signatures in a COB that are located in the COB pool. The resource history in the identified COB could be put to use to pre-allocate resources according to the resource history.

In embodiments, the COB can only be associated with one application, so the COB can have commit signatures corresponding to one application. In embodiments, when an application opens a DB file under commit, if the application does not have a COB attached in the journal that the DB file is sent to, the computer system can look for the COB in the COB pool. If the COB is not in the COB pool, a new COB can be created and added to the journal associated with the DB file. In embodiments, after identifying the COB signature, the operation 130 can proceed to an operation 140.

In operation 140, the method can include retrieving a first set of resource data corresponding to the application. In embodiments, the first set of resource data is an electronic representation of the resource history stored in one or more commit signatures in the form of data, the one or more commit signatures corresponding to the application. For example, the resource history can include, amongst other things, one or more resources previously used by the computer system to successfully execute the application. For example, the first set of resource data could include the memory, processing power, if one or more particular networks were used by the computer system, or file space previously used by the computer system in order to successfully complete the application. In embodiments, the first set of resource data can include statistical information pertaining to the application. For example, the statistical information can be quantitative information pertaining to the resources used by the computer system. In embodiments, a metric can be included in the statistical information to compare transactional information to what can be expected. The metric can be the number and size of rows affected in a file or DB by the transaction. For example, if the number of rows inserted into the DB following the completion of a transaction is 10,000 rows and the average number of rows inserted into the DB is 4,000 rows, the historical resource information for the transaction could be saved in the computer system.

In embodiments, the statistical information can include, among other things, the number of times an application has been executed, the running time of the application, and when each resource was used. In embodiments, by tracking when each resource was used, the resources could be allocated according to the need of them by the computer system while executing the application. For example, rather than making available all necessary resources before running the application, the resources can be made available as they are needed by the computer system. For example, if the processing power must double halfway through the application, then rather than having two units of processing power available from beginning to end, one unit of processing power can be made available in the beginning of the application and then one more unit of processing power can be made available when it is necessary.

In embodiments, using the statistical information contained in the COB and the number of deleted records in a file, the computer system can determine whether to circumvent deleted processing files when inserting rows into the DB. For example, when retrieving records in a certain order matters, the computer system can intelligently decide to add a new record after the last dated record rather than in the place of a deleted record.

In some instances, an application is executed that updates files in a DB and inserts data into repository files causing millions of operations within a computer system to be performed. The repository files are files that can be used for storage or safekeeping of data. The repository files can be used to store information, such as, resource information gathered in response to running an application. In embodiments, the repository files can be used to store commit signatures. Accessing the repository files for allocating the computer system's resources for running an application in the future can be beneficial for allowing the application to run. In embodiments, after retrieving the first set of resource data from the COB, the operation 140 may proceed to an operation 150.

If the DB within the computer system has the resource history contained within a COB, the DB could allocate resources accordingly before running the application. For example, using resource history could reduce the chances of delaying the application or reducing resource contention in future runs. In embodiments, the operation 150 can include allocating the computer system's resources according to the resource history contained in the first set of resource data. In embodiments, allocating resources may include allowing the computer system to access a section of the computer's memory, data in a device interface buffer, one or more files, or the required amount of processing power. In embodiments, allocating resources can include allocating resources by the computer system in the form of allocating journal receiver space within the database before the application starts. In embodiments, allocating resources can include allocating data base file space to allow enough room to perform input/output operations. In embodiments, allocating resources can include allocating the commensurate memory for an operation. In embodiments, allocating resources can include allocating a processor based on processor usage. In embodiments, allocating resources can include setting new options for allowing access path recovery after a DB commit completes. In embodiments, allocating resources can include pinning certain objects in the memory. In embodiments, allocating journal receiver space can include attaching a new journal receiver before the operation begins.

In embodiments, operation 150 can include allocating resources based on multi-system transactions information. For example, starting transactions associated with the slowest computer system first when one or more isolated transactions are running simultaneously could reduce the delay of an application. In embodiments, a job scheduler can organize the timing of when to run the application according to the speed of the computer system. In embodiments, the job scheduler can organize the one or more resources in response to the computer system running a batch job. In embodiments, the batch job may have unattended programs running in parallel that require resources that the job scheduler can allocate for the programs. In embodiments, a hypervisor can manage one or more job schedulers that are organizing one or more programs. In embodiments, each of the previously mentioned allocations could pertain to VMs (e.g. remote computing environments) or physical machines. In embodiments, allocating resources could pertain to networks such as, virtual local access networks (LANs) and physical LANs.

In doing one or more of the aforementioned allocation processes, the resources of the computer system could be allocated according to the resource history and thus the computer system may be prepared before running the application, hence increasing the likelihood of reducing contention between objects and other jobs could be reduced so that resources in the computer system could be utilized in an efficient manner. In embodiments, after allocating resources based off of the first set of resource data the operation 150 may proceed to an operation 160.

In embodiments, the operation 160 includes generating a second set of resource data. In embodiments, the operation 160 can also be proceeded by the decision block 120, in the case that the application does not contain an associated COB. In embodiments, the second set of resource data has substantially similar characteristics as the first set of resource data, such as an electronic representation of the resource history stored in a commit signature. In embodiments, the second set of resource data can be based on the resources used by the computer system. For example, the second set of resource data can include one or more changes in the resources used by the application, such as the application's previous run and the applications most recent run. For example, generating the second set of resource data may occur following the completion of the application. For example, the one or more changes could be the number of times the application was initialized, the amount of memory used, or the amount of processing power used. In embodiments, the second set of resource data can include the statistical information substantially similar to the statistical information included in the first set of resource data. In embodiments, the second set could be different from the first set. For example, the first set could be built based on rare cases and the second set may not be built on rare cases.

In embodiments, operation 160 could be followed by decision block 120 because the application is being initialized for a first time by the computer system. The computer system may not have had the chance to save the commit signatures from the DB commits while running the application. Thus, no record of the application could have been recorded in the form of a first set of resource data unless the first set of resource data was copied into the computer system. In embodiments, the computer system may not have to initialize the application in order to obtain the second set of resource data. For example, the second set of resource data can be generated on another computer system and transferred or sent to the computer system. In embodiments, there can be an external DB containing a copy of each generated second set of resource data that can be connected to the external DB.

The second set of resource data may include commit signatures from DB commits issued from sub transactions at one or more save points or DB commits issued upon completion of an application. In some instances, a transaction could fail to finish to completion and terminate prematurely. In embodiments, in such instances a DB commit is not issued. A save point is a way to implement sub transactions in an application, so that if the application terminates, the application can start over at the last save point or at the last sub transaction completed before the application terminated. In some embodiments, the DB commit can be issued after a save point is reached. By issuing a DB commit after a save point, resources used by the computer system to initialize the application until the point where the save point exists can be prematurely recorded, premature meaning before the application or transaction is complete. For example, there may be one or more save points within the application. If the transaction terminates prematurely soon after the save point, the DB can include information corresponding to the resources used after initializing the application up to reaching the save point. In embodiments, the information corresponding to resources used before the application reached the save point may give information as to possible ways for allocating resources for the application in future runs. In embodiments, the computer system can use the save point as a starting point rather than starting from the beginning of the application. In embodiments, initiating save points can be beneficial while running batch jobs, since batch jobs are programs that run to completion without manual intervention, so resource history can be lost if the program does not complete. In embodiments, a DB commit can also save resources needed in order to perform a rollback or an action the computer system takes to bring the database to a previous state, since rollbacks can be resource intensive.

In embodiments, the COB information can be saved after an initial program load (IPL). For example, if the application is an operating system, the COB information may be saved after the operating system is loaded on to the computer system. In embodiments, the commit signatures can also be saved after a commit operation is issued following a save restore. For example, the commit operation can be issued at various 'checkpoints' or 'intervals' within the application. For example, the commit operation can be issued prior to completing the installation or load of the application. In embodiments, in doing so the COB could save statistical information pertaining to the one or more commit signatures, verifying one or more reasons the application could have terminated prior to completion, and allocating computing resources for initializing the application starting from the last save point. In embodiments, after generating the second set of resource data the operation 160 can proceed to an operation 170.

In embodiments, the operation 170 can include saving the second set of resource data. In embodiments, the operation 170 may include attaching the second set of resource data to the application or saving it in the COB pool. In embodiments, updating the COB can include replacing the first set of resource data with the second set of resource data. Although the second set of resource data can replace the first set of resource data, the second set of resource data can contain resource history from the first set of resource data. For example, the second set can contain an average, weighted average, or a minimum/maximum of the resource history between the first set of resource data and the second set of resource data. In embodiments, updating the COB can occur after issuing commit operations. For example, in embodiments, allocating resources corresponding to the application in the future may occur based on second set of resource data. In embodiments, the operation 170 can include updating the COB with the second set of resource data corresponding to the initialized application. The operation 170 can include replacing the first set or resource data stored in the COB with the second set of resource data. In embodiments, after updating the COB with the second set of resource data, the method 100 can conclude.

Figure 2:
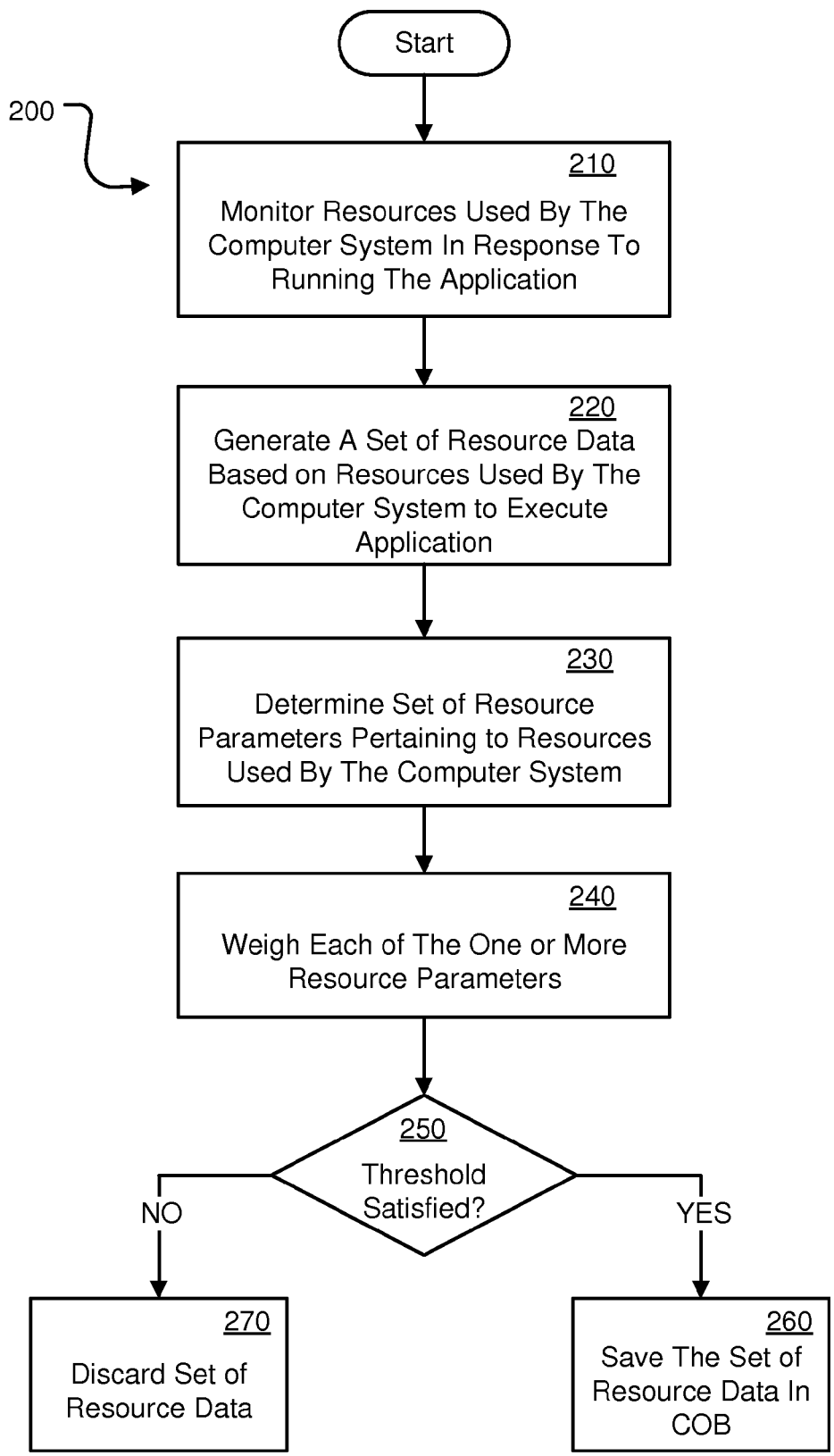
FIG. 2 illustrates a flowchart for a method of saving a COB corresponding to an application based on a systems resource usage, according to various embodiments.

Now turning to FIG. 2, a flowchart for a method 200 of generating a set of resource data can be seen, according to various embodiments. In embodiments, the method 200 can describe aspects of operation 160, 170 from FIG. 1, but more specifically can describe the process of generating a set of resource data for applications that do not contain a corresponding COB. For example, in embodiments, the method can be directed to describe generating a set of resource data for particular applications that do not contain a corresponding COB.

In embodiments, the method 200 can include, in operation 210, monitoring an application. In embodiments, monitoring an application may be in response to initializing an application. In embodiments, monitoring the application may include monitoring the resources usage by the computer system in response to running the application. Monitoring the resources can include collecting the one or more commit signatures corresponding to the one or more issued applications. In embodiments, initializing the application may be accomplished by an end user. In embodiments, after monitoring the application in the operation 210, the operation can proceed to an operation 220.

In embodiments, the operation 220 can include generating a set of resource data. In embodiments, the operation 220 can be substantially similar to operation 160. In embodiments, generating the set of resource data can be based on monitoring the application. In embodiments, generating the set of resource data can include organizing the commit signatures corresponding to the issued DB commits throughout the running of the application, along with, saving such information as the length of time the application ran. For example, organizing the commit signatures according to the particular resource. In embodiments, the set of resource data may include information pertaining to the resource usage by the computer system in response to running the application. For example, the set of resource data can be organized by amount of memory used or the file space needed in order for the application to successfully complete.

In embodiments, the set of resource data can have substantially similar characteristics as the set of resource data from operation 160, such as an electronic representation of the resource history stored in one or more commit signatures in the form of data, the one or more commit signatures corresponding to the application. In embodiments, generating the set of resource data can be substantially similar to generating the set of resource data from operation 160. For example, generating the set of resource data can include recording one or more changes in the resources used by the application since previously running the application. In embodiments, generating the set of resource data can be in response to the application not having an attached COB or an associated COB in the COB pool. In embodiments, after generating the set of resource data, the operation 220 can proceed to an operation 230.

In embodiments, the operation 230 can include determining a set of resource parameters based on the resource usage for running the application, in the case of the application not having an associated COB. In embodiments, the set of resource parameters may be organized into a list of one or more resource parameters according to resources used by the application, e.g. memory, processing power, file space, etc. For example, in embodiments, a first resource parameter could correspond to the amount of memory used. In embodiments, a second resource parameter could correspond to the amount of processing power used. In embodiments, the set of resource parameters may include a resource parameter not associated with a particular resource, such as a resource parameter corresponding to the number of times the application has been initialized. Determining the set of resource parameters may be achieved by analyzing the one or more commit signatures after issuing a DB commit. In embodiments, after determining the set of resource parameters, the operation 230 may proceed to an operation 240.

In embodiments, the operation 240 can include weighing the one or more resource parameters. In embodiments, the one or more resource parameters may be weighted according to the importance of a resource parameter with respect to efficiently running an application. Efficiency can depend on, amongst other things, running time of the application, reducing resource contention, reducing delay, and conserving a computer systems resources. For example, the importance of the resource parameter can be based on how much time is saved between allocating a particular resource for an application and not allocating the particular resource for the application. For example, allocating the memory of a computer system could be more important for allowing an application to run than allocating processing power. For example, the application may not rely heavily on resources but the application may be executed often, so the number of time the application is executed can be weighted heavily for the particular application. For example, the resource parameter corresponding to number of times an application is initiated may be weighed twice as much as the resource parameter corresponding to the memory usage of the computer system. In embodiments, the relative weights given to the resources may be determined by the end user. In embodiments, after weighing the one or more resource parameters the operation 240 can proceed to a decision block 250.

In embodiments, the decision block 250 can include determining if the set of resource parameters satisfy a threshold. In embodiments, the threshold may be a numerical representation indicating the limit of an acceptable difference between the value of the weighted resource parameter and a determined value based on a particular resource that represents a measure of the benefit to saving the set of resource data. The benefit to saving the set of resource data could be the quantity of the computer system's resources that are conserved by allocating resources for a particular application versus not allocating the resources for that application. The determined value and the acceptable difference may be assigned by the database manager in advance to initializing the application. By implementing the threshold, the computer system could distinguish applications that have a history or high probability of causing resource contention from applications that do not. For example, if the application does not require relatively many resources compared to another application or so few resources that allocating the resources for the application may actually waste more resources than just running the application. The threshold can be based off the effectiveness of saving one or more commit signatures versus not saving the one or more commit signatures. The number of times an application is initialized can be factored in while determining the threshold. For example, the application can require a minimal amount of resources but if the application is constantly being run, saving the commit signatures can be useful for limiting excessive resource usage. In embodiments, each resource parameter from the set of resource data can satisfy a separate threshold, and the aggregate of thresholds satisfied can determine if the application's resource history should be saved. In embodiments, after determining that the set of resource parameters satisfies the threshold, the operation can proceed to an operation 260; otherwise, the operation can proceed to an operation 270.

In embodiments, the operation 260 can include saving the set of resource data in a COB following the execution of an application, if the one or more resource parameters satisfy a threshold. In embodiments, the operation 260 can be substantially similar to the operation 170. In embodiments, saving the set of resource data in the COB can include saving all the resource history pertaining to resource usage by the computer system in order to successfully execute the application, as well as, limit excessive resource usage. In embodiments, retrieving the set of resource data may be accomplished in operation 140. In embodiments, saving the set of resource data can include saving the commit signature to the COB. In embodiments, the COB may be attached to the application or stored in the COB pool. In embodiments, the method can include discarding the COB, if the one or more parameters do not satisfy the threshold.

The operation 260 can include, in embodiments, recording one or more COBs in a multi-transactional COB (MT-COB). In embodiments, the MTCOB is a construct that contains a record of one or more COBs in the form of an organized list of COBs. In embodiments, the one or more COBs are not actually stored in the MTCOB; rather, the MTCOB can contain summary information included in the one or more COBs. In some embodiments, the MTCOB could be included in the COB pool. In embodiments, the one or more COBs represented in the MTCOB could have the same commit signature, and thus, in order to use the resource history contained in the MTCOB the job would need to match the signature contained in the MTCOB.

In embodiments, the operation 270 can include discarding the set of resource data. In embodiments, discarding may include not saving the set of resource data in the COB. Discarding may also include updating in DB some reference to the application, in case that the application is initialized again so that the computer system does not waste resources generating another set of resource data. Discarding the set of resource data can be due to the set of resource parameters corresponding to the resource data not achieving the threshold, therefore not worth saving with respect to efficiently using resources. In embodiments, a set of resource data that was recently discarded can be saved if there is an increase in the number of times the application is run. For example, if the application has been initialized many times since being discarded, and saving the set of resource data could be pertinent to efficiently using resources, then the set of resource data can be saved. In embodiments, after the set of resource data has been saved or discarded, the method 200 can conclude.

Figure 3:
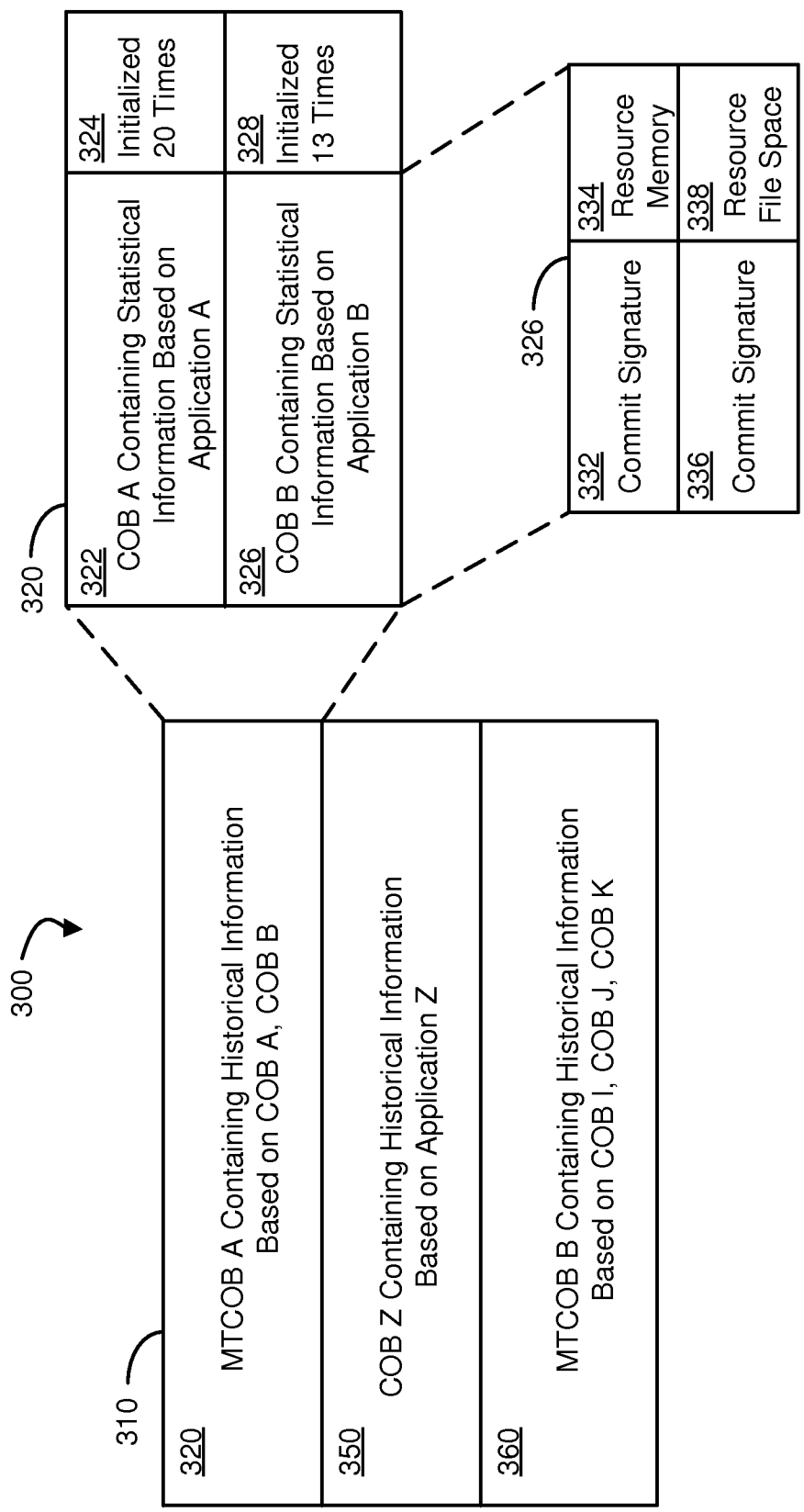
FIG. 3 illustrates a diagram of a COB pool, according to various embodiments.

Now turning to FIG. 3, an example diagram 300 illustrating the hierarchy within a COB pool 310 can be seen, according to various embodiments. In embodiments, the COB pool 310 may include one or more MTCOBs 320, 360, as well as, a COB 350. In embodiments, MTCOB A 320 can contain resource history based on one or more COBs, such as COB A 322 and COB B 326. MTCOB B 360 can include resource history pertaining to one or more COBs, such as COB I, COB J, and COB K. The resource history contained in the one or more COBs can be based on one or more commit signatures corresponding to an application. In embodiments, one or more COBs can be intelligently organized in a MTCOB based on commit signatures, and the MTCOB can accordingly improve the efficiency of allocating resource usage for the one or more COBs. For example, a MTCOB can correspond to an application, where an application can have four modules, where each module can have its own distinct COB. Each COB can include 4,000 table size changes. The computer system could increase table size by 16,000 (in proportion to the size of each distinct COB) when the application is initiated instead of sequentially allocating resources in response to the order of specific modules being executed. The table size being related to file space in the computer systems memory. Based on signature and historical information, we could intelligently track how each COB relates to each other and amount resources they are using. The computer system could intelligently determine this by tying them together through the MTCOB, because the computer system could identify the COBs relating to the transactions referenced by the commit signatures. This can cause an occurrence of only one input/output (TO), rather than multiple IOs. This MTCOB organization of the COBs according to commit signatures can cause the computer system to determine IO decisions more intelligently.

In embodiments, the COB pool 310, can also include one or more COBs 350 that are not contained within a MTCOB. The COBs are able to exist within the COB pool without being within a MTCOB based on a high or low resource usage of the signatures contained in the COBs. The high or low resource usage can be evaluated by comparing the resource of the COB to a threshold.

Now taking a closer look at the contents of MTCOB 320, the contents can include, within it, among other things, one or more COBs, e.g. COB A 322 and COB B 326, where each COB can correspond to an application. In embodiments, the one or more COBs 322, 326 can include one or more commit signatures. For example, COB B 326 can contain resource history from one or more commit signatures 332, 336. In embodiments, the one or more COBs can also include statistical information pertaining to the resources associated with the application. For example, the number of times the application has been initialized 324, 328.

An enlarged view of the contents of COB B 326 can be seen, according to various embodiments. In embodiments, COB B 326 can include resource history pertaining to one or more resources used by a computer system for allowing an application B to run. In embodiments, COB B 326 can include, among other things, resource history of one or more commit signatures 332, 336 verifying a commit was issued and one or more computer system resources 334, 338 that were needed to allow the application to run. For example, COB B can include the commit signature 332 and the corresponding memory 334 used by the computer system in order to run the application. For example, COB B can also include the commit signature 336 and the corresponding file space 338 needed by the computer system in order to allow the application to run. Resources used by the computer system could also include processing power usage, journal space, or a plethora of other resources needed that can allow the computer system to complete the application.

For an example of a MTCOB in the scope of a COB pool, consider a computer that has a hypervisor running directly on the hardware. The hypervisor controls the hardware and manages one or more virtual machines (VMs). A VM needs resources to execute an application to completion. The hypervisor can allocate resources from the hardware to the VM. The hypervisor can manage a first VM and a second VM. The hypervisor can assign computing resources to the first VM and the second VM. The first VM can run a first set of applications and the second VM can run a second set of applications. Each application may have a corresponding COB. In embodiments, the COB pool includes one or more COBs pertaining to the first set of applications and one or more COBs pertaining to the second set of applications. In embodiments, the hypervisor can contain a copy of the COB pool. In embodiments, the hypervisor can distribute information from the COB pool to the first VM or the second VM upon a request from the first VM or second VM. The hypervisor can allocate resources to the first or second VM according to the request.

In some embodiments, the first VM and the second VM can each contain a copy of the COB pool or a portion of the COB pool that pertains to the applications running on each VM. In embodiments, the portion of the COB pool stored in the first VM and second VM can be in the form of an MTCOB. For example, the first VM and second VM can store a first MTCOB and a second MTCOB, respectively. The first MTCOB can store one or more COBs pertaining to applications that are run by the first VM. The second MTCOB can store one or more COBs pertaining to applications that are run by the second VM.

In embodiments, the VM generating the set of resource data that later satisfies the threshold can save the set of resource data in the MTCOB. In embodiments, if the VM initializes an application and there are no associated commit signatures stored in the COB pertaining to the application, the VM can monitor the resource used by the computer system for running the application and generate a set of resources in the form of saving one or more commit signatures. If after generating the set of resources, the set of resources satisfy the threshold, the set of resources can be saved to the MTCOB.

In certain embodiments, the MTCOB can record the number of changes in a COB corresponding to an application by statistical methods, such as an average, running average, maximum, or standard deviation. The changes may be between the resources used from the first time the application was executed and the most recent time the application was executed. For example, the changes between the first set of resource data and the second set of resource data could be changes from consecutive application executions (e.g. the fifth time the application was executed and the sixth time the application was executed). For example, the changes may be the amount of memory used, processing power usage, or file spaced needed by the computer system.

The MTCOB may analyze recorded information in the form of one or more commit signatures to forecast resource requirements based on the statistical information in order to allocate resources more efficiently for running the application. Resource requirements can be forecasted by taking the resource history contained in a commit signature with respect to a particular application. For example, examining the processing power needed by the computer system to complete an application for each time the application is initialized could be used as information for forecasting resource requirements. The processing power can increase gradually (e.g. an increase of a few percent compared to the last run). The processing power can double since the last time the computer system executed the application.

In embodiments, the resource requirements can also include the total number of changes that are made since the last time the computer system executed the application. The total number of change can include one or more resources. In embodiments, the computer system, MTCOB can determine resource requirements over the time in particular transactions rather than an application based on the corresponding commit signatures.

Figure 4:
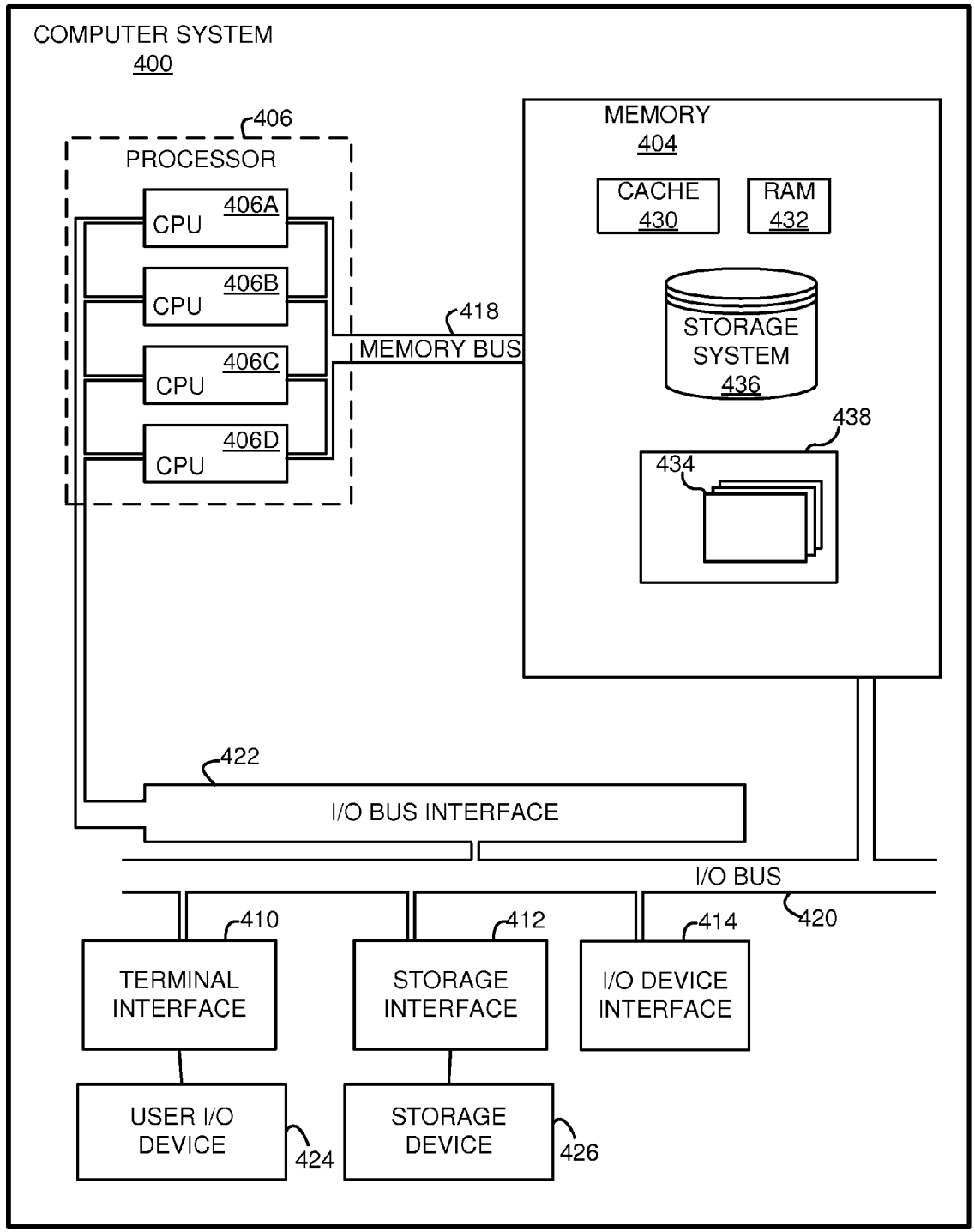
FIG. 4 illustrates a block diagram of a system for environmental based location monitoring, according to various embodiments.

FIG. 4 depicts a high-level block diagram of a system for implementing an embodiment of the disclosure. The mechanisms and apparatus of embodiments of the present disclosure can apply equally to an appropriate computing system. The major components of the computer system 400 include one or more processors 406, a main memory 404, a terminal interface 410, a storage interface 412, an I/O (Input/Output) device interface 414, a user I/O device 424, and a storage device 426, all of which are communicatively coupled, directly or indirectly, for inter-component communication via a memory bus 418, an I/O bus 420, and an I/O bus interface unit 422.

The computer system 400 may contain one or more general-purpose programmable central processing units (CPUs) 406A, 406B, 406C, and 406D, herein generically referred to as the processor 406. In an embodiment, the computer system 400 contains multiple processors typical of a relatively large system. In some embodiments, the computer system 400 may be a single CPU system. Each processor 406 can execute instructions stored in the main memory 404 and may include one or more levels of on-board cache 430.

In an embodiment, the main memory 404 may comprise a random-access semiconductor memory, storage device, or storage medium (either volatile or non-volatile) for storing or encoding data and programs 434. In another embodiment, the main memory 404 represents the entire virtual memory of the computer system 400, and may also include the virtual memory of other computer systems coupled to the computer system 400 or connected via a network. The main memory 404 is conceptually a single monolithic entity, but in other embodiments the main memory 404 is a more complex arrangement, such as a hierarchy of caches 430 and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 404 may store all or a portion of the following: RAM 432, cache 430, storage system 436, one or more programs/utilities 434, and at least one set of program modules 438. Although the RAM 432, cache 430, storage system 436, one or more programs/utilities 434, and at least one set of program modules 438 are illustrated as being contained within the memory 404 in the computer system 400, in other embodiments some or all of them may be on different computer systems and may be accessed remotely, e.g., via a network. The computer system 400 may use virtual addressing mechanisms that allow the programs of the computer system 400 to behave as if they only have access to a large, single storage entity instead of access to multiple, smaller storage entities. Thus, while the RAM 432, cache 430, storage system 436, one or more programs/utilities 438, and at least one set of program modules 434 are illustrated as being contained within the main memory 404, these components are not necessarily all completely contained in the same storage device at the same time. Further, although the RAM 432, cache 430, storage system 436, one or more programs/utilities 438, and at least one set of program modules 434 are illustrated as being separate entities, in other embodiments some of them, portions of some of them, or all of them may be packaged together.

In an embodiment, the memory 404 comprise instructions or statements on the processor 406 or instructions or statements that are interpreted by instructions or statements on the processor 406 that can execute applications, to carry out the functions as further described with reference to the figures as discussed herein. A hypervisor can manage the memory 404 and the processors 406 to one or more VMs. The one or more VMs can execute applications and allocate resources, made available to them by the hypervisor, according to the applications resources history. The one or more VMs can also allocate resources that are allotted to them before the application is initialized. The VM can have resources available to them prior to initializing the application and does not have to ask the hypervisor for more resources every time an application is initialized. In embodiments, the main memory 404 can comprise the COB pool, one or more MTCOBs, COBs, and one or more commit signatures, and can be implemented in hardware via semiconductor devices, chips, logical gates, circuits, circuit cards, and/or other physical hardware devices in lieu of, or in addition to, a processor-based system. In embodiments, the main memory can be updated with the set of resource data as in operation 170, 260 following the execution of one or more applications. In an embodiment, the main memory 404 comprise data in addition to instructions or statements.

The memory bus 418 provides a data communication path for transferring data among the processor 406, the main memory 404, and the I/O bus interface 422. The I/O bus interface 422 is further coupled to the I/O bus 420 for transferring data to and from the various I/O units. The I/O bus interface unit 422 communicates with multiple I/O interface units 410, 412, 414, 424, and 426 which are also known as I/O processors (IOPs) or I/O adapters (IOAs), through the I/O bus 420.

The I/O interface units support communication with a variety of storage and I/O devices. For example, the terminal interface unit 410 supports the attachment of one or more user I/O devices 424, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 424 and the computer system 400, and may receive output data via the user output devices. For example, a user interface may be presented via the user I/O device 424, such as displayed on a display device, played via a speaker, or printed via a printer.

The storage interface 412 supports the attachment of one or more disk drives or direct access storage devices 426 (which are typically rotating magnetic disk drive storage devices, although they could alternatively be other storage devices, including arrays of disk drives configured to appear as a single large storage device to a host computer). In another embodiment, the storage device 426 may be implemented via any type of secondary storage device. The contents of the main memory 404, or any portion thereof, may be stored to and retrieved from the storage device 426, as needed. The I/O device interface 414 provides an interface to any of various other input/output devices or devices of other types, such as printers or fax machines. The network interface provides one or more communications paths from the computer system 400 to other digital devices and computer systems; such paths may comprise, e.g., one or more networks.

Although the memory bus 418 is shown in FIG. 4 as a relatively simple, single bus structure providing a direct communication path among the processors 406, the main memory 404, and the I/O bus interface 422, in fact the memory bus 418 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 422 and the I/O bus 420 are shown as single respective units, the computer system 400 may, in fact, contain multiple I/O bus interface units 422 and/or multiple I/O buses 420. While multiple I/O interface units are shown, which separate the I/O bus 420 from various communications paths running to the various I/O devices, in other embodiments some or all of the I/O devices are connected directly to one or more system I/O buses.

In various embodiments, the computer system 400 is a multi-user mainframe computer system, a single-user system, or a server computer or similar device that has little or no direct user interface, but receives requests from other computer systems (clients). In other embodiments, the computer system 400 is implemented as a desktop computer, portable computer, laptop or notebook computer, tablet computer, pocket computer, telephone, smart phone, or any other appropriate type of electronic device.

FIG. 4 is intended to depict the representative major components of the computer system 400. But, individual components may have greater complexity than represented in FIG. 4, components other than or in addition to those shown in FIG. 4 may be present, and the number, type, and configuration of such components may vary. Several particular examples of such additional complexity or additional variations are disclosed herein; these are by way of example only and are not necessarily the only such variations. The various program components illustrated in FIG. 4 and implementing various embodiments of the invention may be implemented in a number of manners, including using various computer applications, routines, components, programs, objects, modules, data structures, etc., and are referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
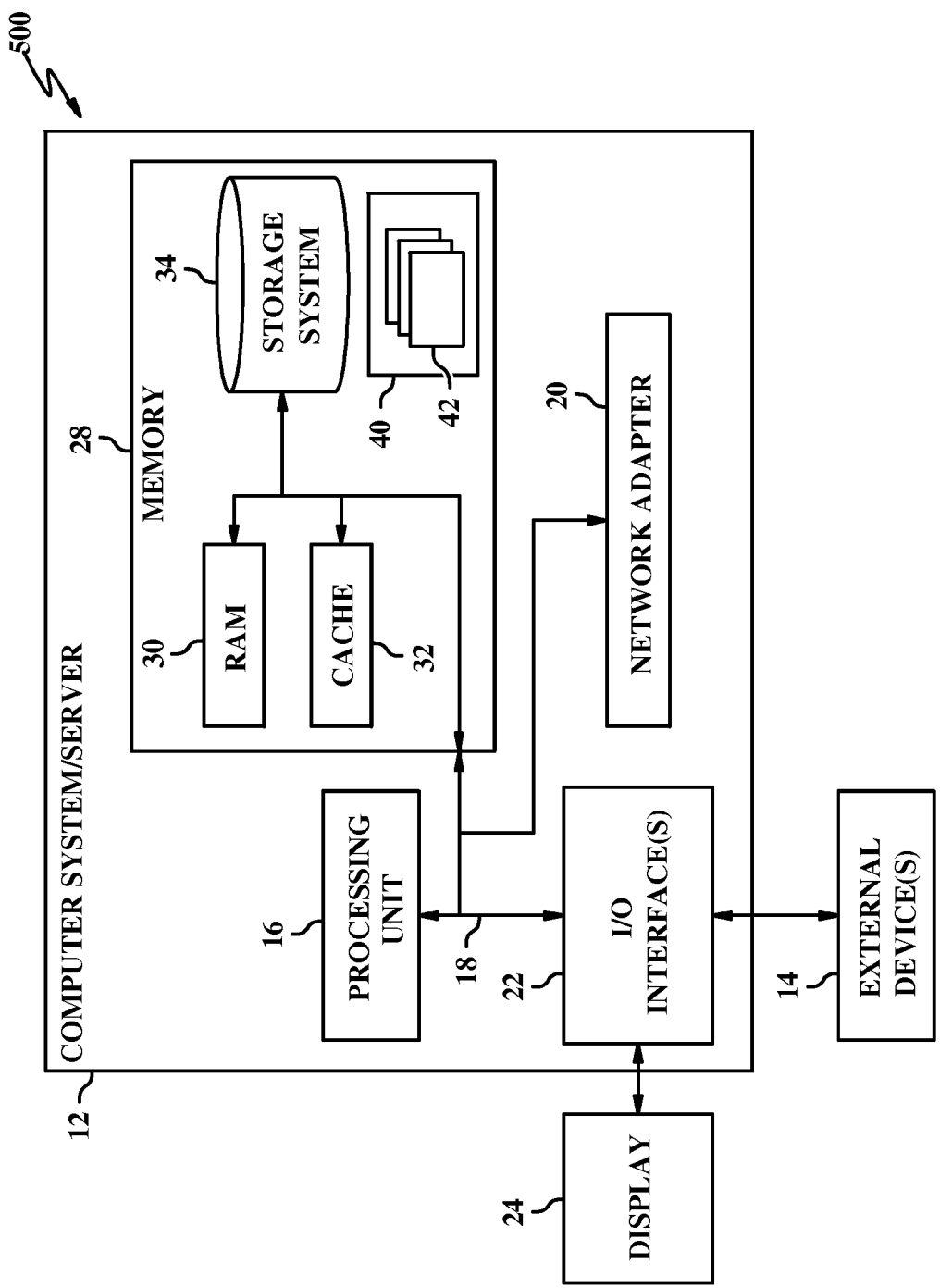
FIG. 5 depicts a cloud computing node according to an embodiment of the present invention.

Referring now to FIG. 5, a schematic of an example of a cloud computing node is shown. Cloud computing node 500 is only one example of a suitable cloud computing node and is not intended to suggest any limitation as to the scope of use or functionality of embodiments of the invention described herein. Regardless, cloud computing node 500 is capable of being implemented and/or performing any of the functionality set forth hereinabove.

In cloud computing node 500 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 500 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
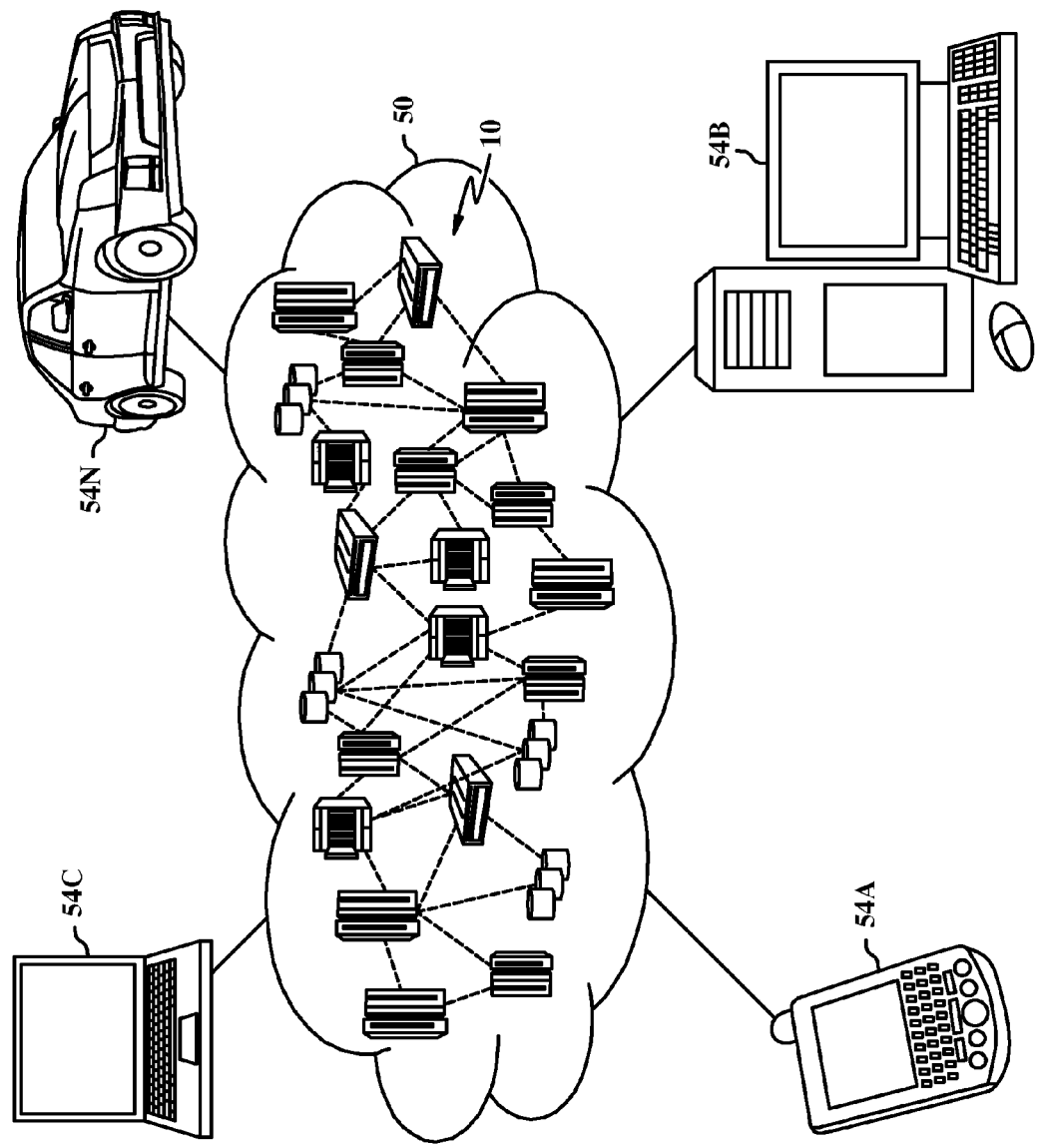
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
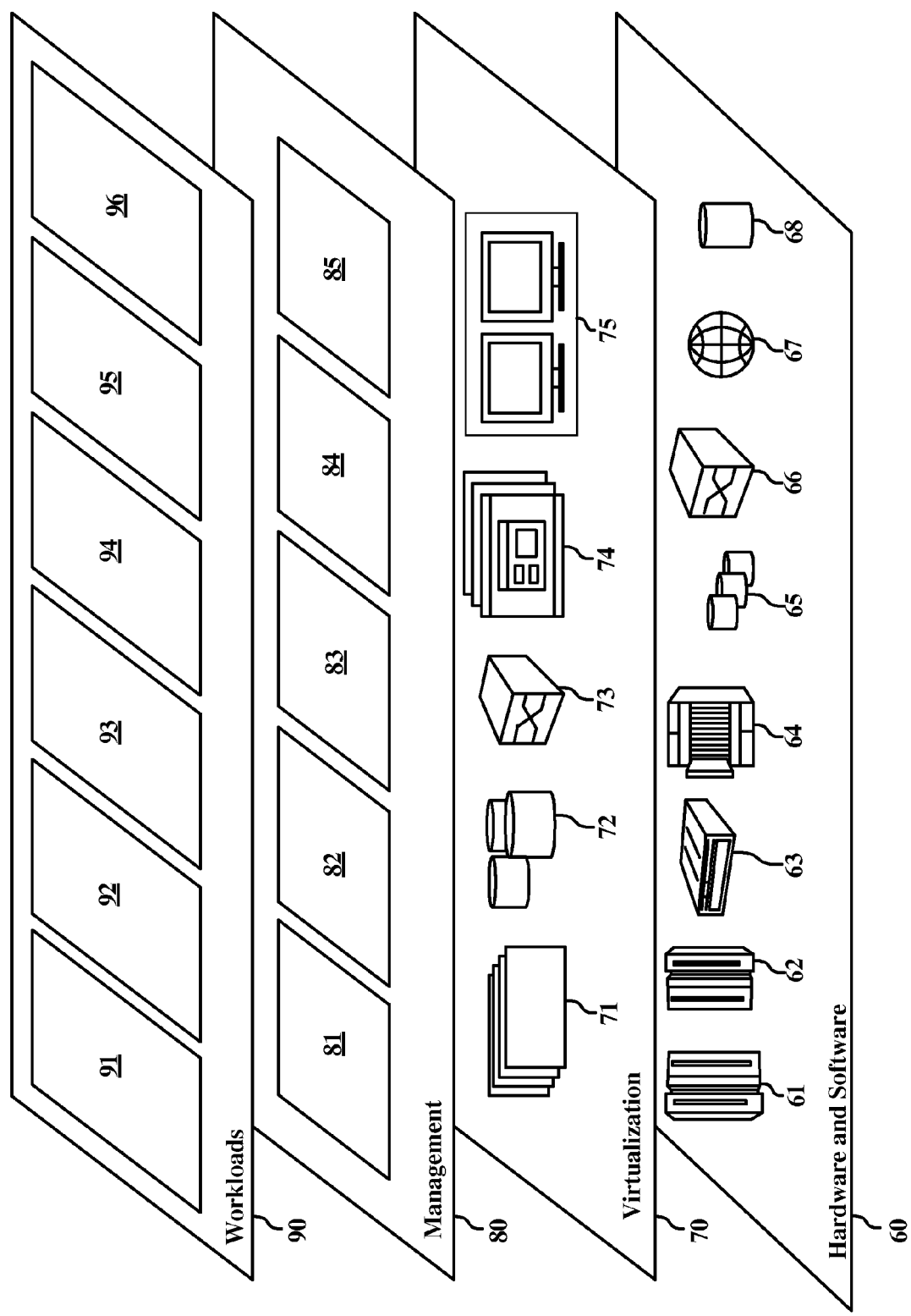
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment (e.g. allocating the computing resources based on the application's historical information as disclosed herein). Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a typical cloud workload such as a 'mobile desktop' 96.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for managing computing resources, the system comprising:
   a processor; and
   a computer readable storage medium having program instructions embodied therewith, the program instructions executable by the processor to cause the system to:
   initialize in a computer system, an application, the application corresponding to one or more commit signatures, each of the one or more commit signatures corresponding to a transaction within the application;
   determine that the one or more commit signatures are not saved in a commit block (COB);
   generate, in response to determining that the commit signature is not saved in the COB, a set of resource data by saving the one or more commit signatures, the set of resource data containing information for allocating resources corresponding to the application in the form of one or more commit signatures, wherein the first set of resource data includes: memory usage, processing power usage, network configurations, file space, statistical information pertaining to the first set of resource data, and timestamps based on the resource usage; and
   save the set of resource data in the COB, the set of resource data corresponding to the one or more commit signatures.

2. The system of claim 1, wherein the program instructions executable by the processor further cause the system to:
   determine one or more resource parameters, wherein the one or more resource parameters correspond to resource usage, in response to the computer system initializing the application; and
   save, in response to the one or more resource parameters satisfying a threshold, the commit signature to the COB, the COB including a record of one or more commit operations performed by the system.

3. The system of claim 2, wherein the program instructions executable by the processor further cause the system to:
   save one or more COBs to a multi-transactional commit block (MTCOB), the MTCOB including a record of one or more COB transactions.

4. The system of claim 3, further comprising:
   analyze one or more commit signatures in the MTCOB, wherein the one or more commit signatures correspond to one or more changes in an amount of resources used by the computer system over time for executing a corresponding application;
   forecast resource requirements in the application; and
   manage and allocate resources, in response to initializing the application based on the resource requirements, wherein the application contains a corresponding COB.

5. The system of claim 3, wherein the MTCOB corresponds to a virtual machine (VM), the one or more COBs saved in a particular MTCOB according to one or more applications running on the VM, each application corresponds to a COB.

6. The system of claim 5, wherein the program instructions executable by the processor further cause the system to:
  save one or more MTCOBs in a COB pool, the COB pool includes a record of one or more MTCOBs.

7. The system of claim 6, wherein the COB pool is managed by a hypervisor, the hypervisor managing one or more virtual machines.

8. A computer program product for managing computing resources, the computer program product comprising a computer readable storage medium having program instructions embodied therewith, wherein the computer readable storage medium is not a transitory signal per se, the program instructions executable by a computer to perform a method comprising:
  initializing in a computer system, an application, the application corresponding to one or more commit signatures;
  determining that the one or more commit signatures are not saved in a commit block (COB);
  generating, in response to determining that the commit signature is not saved in the COB, a set of resource data by saving the one or more commit signatures, the set of resource data containing information for allocating resources corresponding to the application in the form of one or more commit signatures, wherein the first set of resource data includes: memory usage, processing power usage, network configurations, file space, statistical information pertaining to the first set of resource data, and timestamps based on the resource usage; and
  saving the set of resource data in the COB, the set of resource data corresponding to the one or more commit signatures.

9. The computer program product of claim 8, wherein the program instructions are executable by the computer to perform the method further comprising:
  determining one or more resource parameters, wherein the one or more resource parameters correspond to resource usage, in response to the computer system initializing the application; and
  saving, in response to the one or more resource parameters satisfying a threshold, the commit signature to the COB, the COB including a record of one or more commit operations performed by the system.

* * * * *